Dec. 17, 1940.     W. A. KELSEY     2,225,500
MEASURING INSTRUMENT
Filed July 31, 1940     2 Sheets-Sheet 1
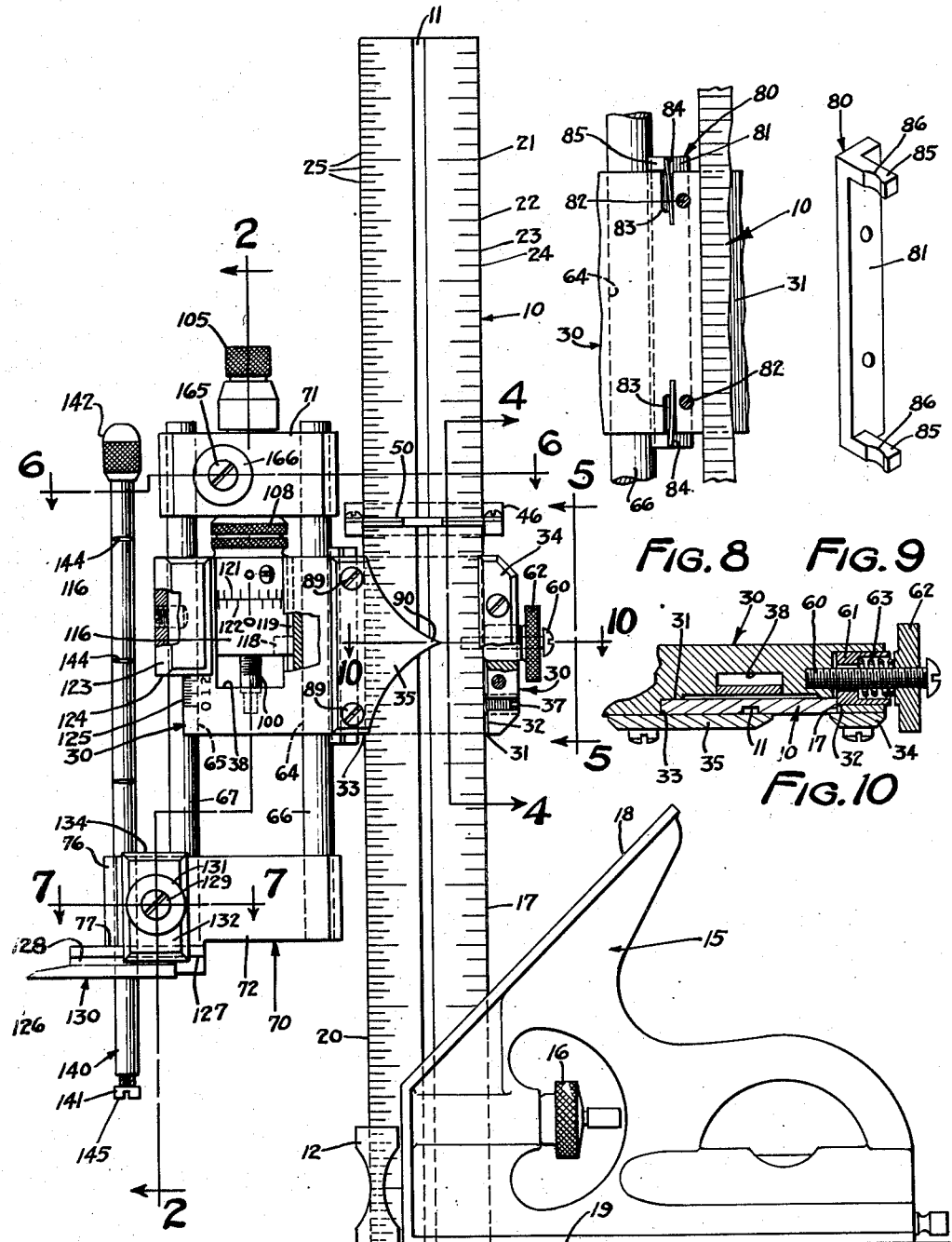
INVENTOR
WILLIAM A. KELSEY
By Paul, Paul & Moore
ATTORNEYS

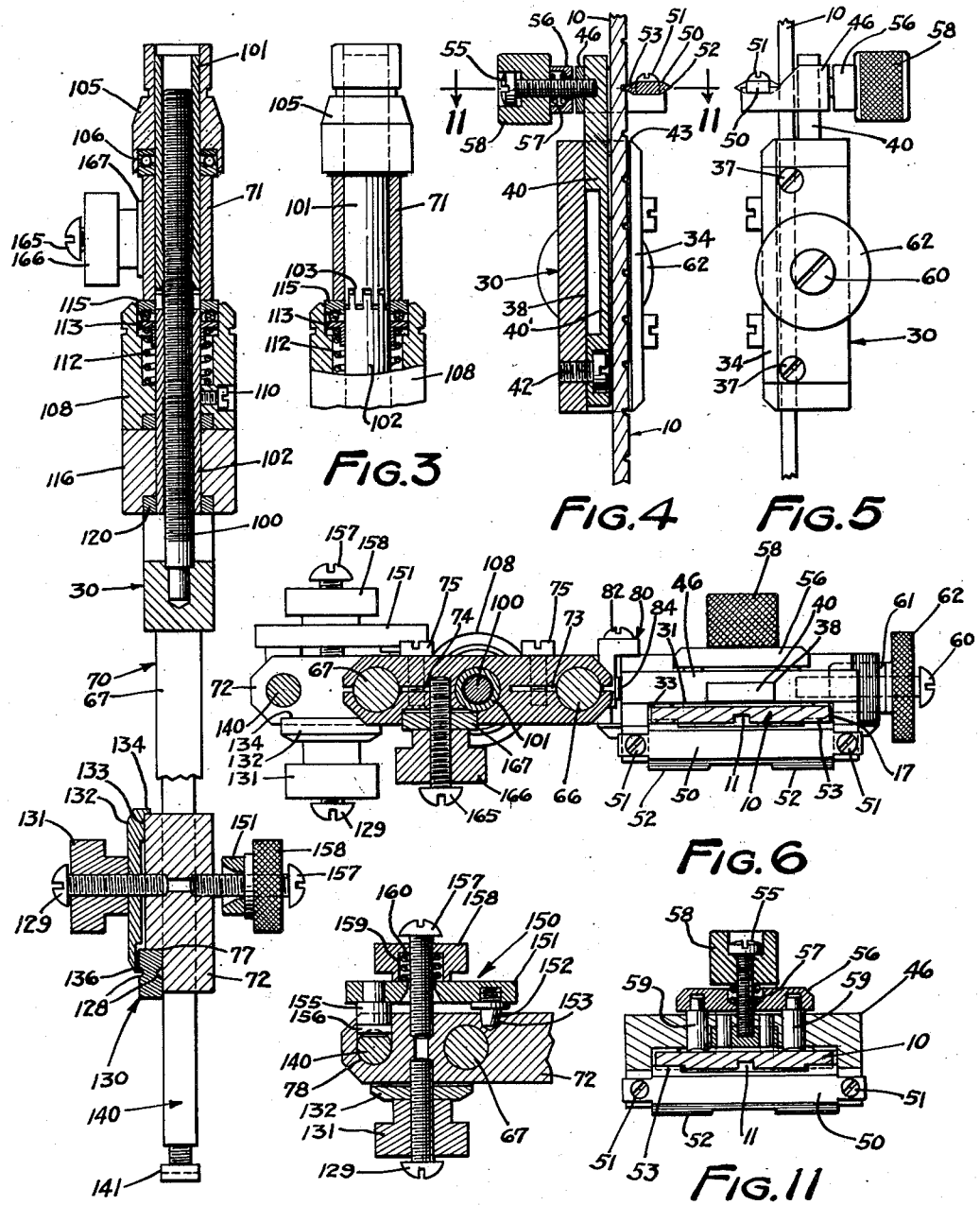

Patented Dec. 17, 1940

2,225,500

UNITED STATES PATENT OFFICE 2,225,500

MEASURING INSTRUMENT

William A. Kelsey, Minneapolis, Minn.

Application July 31, 1940, Serial No. 348,977

21 Claims. (Cl. 33—169)

This invention relates to measuring instruments and more particularly to instruments for measuring the height or depth of surfaces above or below a plane of reference.

It has been discovered that standard machinists' scales now available on the market are capable of providing measurements of an extremely high degree of accuracy if properly utilized. Heretofore, such scales have been provided merely with a vernier arrangement and as thus provided, the highest degree of accuracy of the scale is not completely utilized.

In the apparatus of the present invention, the measuring instrument included a standard machinists' scale of the type now commonly available, and by appropriately utilizing the configuration of the scale markings, provides a means of measurement which is capable of accuracy to within one ten-thousandths of an inch.

It is accordingly an object of the invention to provide an improved measuring instrument, and more particularly, to provide an improved height and depth gauge.

It is a further object of the invention to provide an improved measuring instrument utilizing a standard machinists' scale of the type in which the graduation lines are etched or otherwise formed as intaglio grooves in the surface of the scale.

It is a further object of the invention to provide in such a measuring instrument a micrometer scale device capable of being read accurately and quickly and to provide not only a height measurement for top or bottom surfaces, but also to provide means whereby distances below a plane of reference may be determined accurately.

It is a further object of the invention to provide an improved apparatus in which an accurate adjustment micrometer measuring instrument may be indexed as a whole along a standard machinists' scale, and to provide further indexing means capable of selecting either the measurement units of the scale or fractional measurement units of the scale, selectively.

It is likewise an object of the invention to provide an improved measuring instrument capable of being manufactured at low cost and capable of being applied to a variety of standard machinists' scales and under all conditions of providing accurate measurements. It is likewise an object of the invention to provide a measuring instrument in which all of the parts are held in contact with each other under uniform pressure thereby obviating the effects of lost motion.

These and other objects of the invention are those inherent and implied by the apparatus herein illustrated, described and claimed.

The invention is illustrated with reference to the drawings in which

Figure 1 is a side elevational view partly in section of the invention.

Figure 2 is a fragmentary sectional view taken along the line 2—2 of Figure 1.

Figure 3 is a side elevational view partly in section of a fragment of the apparatus shown in Figure 2.

Figure 4 is a fragmentary sectional view taken along the lines 4—4 of Figure 1.

Figure 5 is a fragmentary elevational view of the apparatus shown in Figure 1 taken in the direction of arrows 5—5 of Figure 1.

Figure 6 is a sectional view taken along the lines 6—6 of Figure 1.

Figure 7 is a fragmentary sectional view taken along the lines 7—7 of Figure 1.

Figure 8 is a fragmentary elevational view of a portion only of the apparatus shown in Figure 1, certain of the parts being removed.

Figure 9 is an isometric view of one of the parts of the apparatus of the present invention.

Figure 10 is a fragmentary cross sectional view taken along the line 10—10 of Figure 1, and Figure 11 is a fragmentary cross sectional view taken along the line 11—11 of Figure 4.

Throughout the drawings, corresponding parts are designated by the same numerals.

In the measuring instrument of the present invention, there is a standard machinists' scale utilized, as the basic medium of measurement. According to present manufacturing procedures, such scales consist of a steel blank having a thickness of about one-tenth to one-eighth of an inch, a width of approximately one inch, and a length ranging from six inches to several feet or more. A scale of this type is shown in the drawings, being generally designated 10.

Throughout the length of the scale 10, there is milled or otherwise formed a groove 11, which is utilized for the purpose of attaching a combination angle and square, generally designated 15, which are supplied as standard equipment with the scale. The member 15 is equipped with a clamping screw 16, which has a part received into the groove 11 such that when the nut 16 is turned, it will draw the member 15 into contact with the edge 17 of the scale thereby holding member 15 in definite relationship with reference to the scale. The member 15 is usually provided with a surface 18, which may be at 45 degrees with reference to the surface 19, and when the block is clamped onto the scale, the surface 19 is at 90 degrees to the edge surfaces 17 and 20 of the scale. The member 15 accordingly serves as a base for holding the scale in a vertical position upon a reference plane R, and as a means for laying out 45° and 90° lines.

For the purpose of the present invention, it is also desirable to provide a stabilizing bar 12, which is clamped to the scale 10 in any suitable manner, the bar 12 and the member 15 thus forming a stable base for the instrument.

As presently manufactured, standard machinists' scales, such as that shown at 10, are provided with a plurality of graduation lines usually including inch marks 21, one-half inch marks 22, one-quarter inch marks 23, and one-eighth inch marks 24. The complete length or merely a portion of the scale may likewise be provided with one-sixteenth inch graduations 25 and occasionally with one thirty-second inch markings. The inch markings 21 are of maximum length, and the one-half inch, one-fourth inch, one-eighth inch and one-sixteenth inch and one thirty-second inch markings are of successively shorter lengths and extending inwardly from opposite edges of the scale.

Each of the markings on the scale appears as a fine narrow line, but in reality the scale markings are grooves which are formed in the surface of the scale.

The usual method of forming the groove is by an etching procedure, and as a result, the groove has a steep side wall and is of appreciable depth. It has been discovered that the side walls of the groove are usually accurate to within one ten-thousandth of an inch and this accuracy is utilized in the present invention. In Figure 4, the scale markings are illustrated in greatly exaggerated cross section for purposes of discussion. The actual depth of the markings is very slight, but are nevertheless of definite cross sectional shape.

The apparatus of the present invention further includes an index member, generally designated 30, which is preferably made of a solid block of metal several times as thick as the scale with which it is used. The index member 30 is milled across at one end to provide a groove 31 having side walls 32 and 33 of a width to accommodate the widest type of standard scale with which the instrument is adapted to be used. The groove 31 is adapted to receive the scale 10 and the scale is held in the groove by a retaining plate 34 and a retaining and index plate 35, the latter being provided with a pointer 90 positioned to cooperate with the graduation lines on scale 10. In the side wall 32 of the groove, there are provided two or more adjustment screws 37 (Figures 1 and 5), which are turned until they snugly engage the edge 17 of the scale, but the screws 37 are not drawn down so tightly as to bind the index member 30 against movement on the scale. The adjustment screws are necessitated by the fact that scales of varying width may be utilized with the same index member 30.

Within the groove 31, there is provided an inner groove 38, which is adapted to receive a spring strip 40, the latter being attached at its lower end to the index member 30 by means of screw 42, as shown in Figure 4. The strip 40 has a thin portion 40' for flexibility, and extends upwardly as shown in Figures 4 and 5 so as to terminate above the upper surface 43 of the member 30. The upwardly extending portion of the strip 40 is provided with a saddle 46, which extends on both sides of the scale as shown in Figures 6 and 11, and carries a detent blade 50, which is attached to the saddle 46 by means of screws 51.

Blade 50 has oppositely disposed knife edges 53 and 52. The knife edges 53 and 52 of the detent 50 are of unequal length, as shown in Figures 6 and 11, the edge 52 being just slightly shorter than the one-inch graduation lines 21 of the scale 10 with which it is used, and the knife 53 being just slightly shorter than the one-eighth inch graduations 24 of the scale 10. By loosening the screws 51, the detent 50 may be reversed so as to present either the knife edge 52 or the knife edge 53 into contact with the scale. When the edge 52 is presented to the scale, only the one-inch graduations will be intercepted whereas when the edge 53 is presented to the scale, the knife edge 50 will engage every one-eighth inch marking, the one-quarter inch marking, the one-half inch marking, and also the inch marking, thereby being engaged and held at every one-eighth inch of scale length.

Upon saddle 46, there is provided a screw 55 which is screwed down solidly so as to be immovable. The screw projects outwardly and carries a clamping bar 56, which is recessed to receive the spring 57. Upon the screw, there is mounted a knurled thumb nut 58, which serves as a stop for spring 57. The clamping bar 56 is provided with pins 59 which project through the saddle 46 and against the back of scale 10.

When thumb nut 58 is screwed outwardly against the head of screw 55, the spring 57 is in the position shown in Figure 11 at which time it bears to some extent upon bar 56 and thereby exerts a slight pressure through pins 59 upon the back of scale 10. This brings the knife edge 53 (or 52, as the case may be) into easy contact with the scale so as to produce a slight, though not positive detaining force between the knife edge 53 (or 52) and the scale marking grooves, as the entire unit 30 is indexed along the scale. This slight detention action enables the operator to know when the knife edge 53 (or 52) is in the scale marking groove selected. Then the thumb nut 58 is tightened down on screw 55, thereby compressing spring 57 into the recess in clamping bar 56, until the nut 58 bears solidly in the bar 56. When this occurs, the bar 56 is moved positively towards saddle 46 and through pins 59 forces scale 10 solidly against knife edge 53 (or 52) thereby immovably locking the knife edge (and hence index member 30) with reference to a selected scale marking line on the scale.

In Figure 4, the graduations of the scale are shown in exaggerated size in order to illustrate the manner in which the detent engages the graduation markings. The detent 50 has the cross section of a thick bluntly sharpened blade and the angularity of the opposed faces of knife edges 52 and 53 is such that the detent will engage the sides of the graduation line grooves, but preferably does not engage the bottom of the groove. In this way, the detent 50 positions itself and is restrained against lateral shifting.

Into the body of the index member 30 and adjacent the retaining plate 34, there is mounted a screw 60 upon which a collar 61 is adapted to slide. The screw 60, it will be noted, projects into the body of the member 30, as shown in Figures 6 and 10, but the diameter of the collar 61 is such that it intercepts and bears against the edge 17 of the scale 10. The thumb nut 62 is likewise mounted upon the screw 60 and serves as a means for forcing the collar 61 toward the scale 10. The collar 61 is recessed to receive spring 63 which is normally compressed, as shown in Figure 10, and hence normally urges the collar 61 with easy pressure, against scale 10. When the thumb nut 62 is tightly turned down, the spring is compressed into the recess in collar 61 until nut 62 bears against and moves the collar 61 to the position as shown in Figure 6, at which time it abuts solidly against the edge 17 of scale 10. This causes the scale to be clamped between the edge 33 of the groove 31 and collar 61 thereby additionally holding the index member 30. This is desirable so as to position the member 30 accurately at right angles to the length of the scale.

At the left side of index member 30, as shown in Figure 1, there is provided a circular bore 64 and an edge groove 65 of semi-circular cross section which are adapted to receive a pair of stout rods 66 and 67 of the frame work, generally designated 70. The frame 70 includes the rods 66 and 67, an upper cross-frame member 71 and a lower cross frame member 72.

Both the upper end and lower cross-frame members 71 and 72 are provided with holes, as illustrated in Figure 6, and the upper frame member 71 is slotted as shown at 73 and 74. Cap screws 75 are provided for clamping the bifurcated parts of the upper cross frame members 71 so as to draw them together in clamping relationship upon the rods 66 and 67, the rods being pressed solidly into the holes of lower frame member 72.

The frame 70 is accordingly adapted to move vertically with reference to the frame 30, but in order to maintain accuracy of measurement, the movement must be restrained and the frame 70 must be maintained in accurate uniform metal to metal contact with the index member 30. In order to provide such contact, the member 30 is provided with a clamp, generally designated 80, illustrated in Figures 1, 6, 8 and 9.

The member 80 is provided with a face portion 81, which is adapted to be held against the body of member 30 by a pair of screws 82. In the upper and lower surfaces of the member 30, there are provided grooves 83 in each of which a spring 84 is placed, the spring being adapted to bear against the upper and lower finger portions 85 of the member 80. Each of the finger portions 85 is provided with a cylindrical surface 86 of a shape so as uniformly to engage a portion of the rod 66 of the frame 70. When the clamp member 80 is initially assembled upon the index member 30, the springs 84, bearing against the finger portions 85, establish the pressure of the clamp against the rod 66. The screws 82 are then drawn down tightly and this pressure is maintained until a subsequent adjustment is necessitated by wear of the parts. In the meantime, the rod 66 is held in contact with the portion of the bore 64 opposite clamp 80 thereby maintaining an accurate metal to metal contact between the index member 30 and the frame 70, essential for accuracy of measurement.

In order to enable accurate indicated measuring movement of the frame 70 with reference to the index member 30, there is provided a micrometer screw arrangement, best illustrated in Figures 1, 2 and 3. In the left-hand portion of the index member 30, as shown in Figure 1, there is a cut-away portion 38, in which there is aligned a micrometer screw 100, the screw being solidly attached to the index member 30 and of a length such that it projects upwardly through the upper cross frame member 71 of the frame 70. Upon the screw 100, there are threaded two nuts 101 and 102, which are keyed together in end-to-end relationship by means of a plurality of fine teeth 103 as shown in Figure 3. The two nuts accordingly rotate together as a unit, but are capable of movement axially with respect to each other, within the limits of thread clearance and as wear occurs on screw 100.

Upon the upper nut 101, there is mounted a knurled cap 105, which is recessed to receive the ball bearing assembly 106, the stationary race of which bears against the surface of the cross frame member 71. Upon the lower nut 102, there is mounted a cylindrical barrel 108, which is fastened to the nut 102 by means of a set screw 110. The barrel 108 is recessed to receive a spring 112, the upper end of the spring being seated against the ball bearing race 113, which is movable axially in the recess. The upper stationary race 115 of the ball bearing assembly is seated against the lower surface of the cross frame member 71.

It will thus be observed that as the spring 112 tends to move the ball races 113 and 115 upwardly against frame member 71, it also tends to force the nut 102 downwardly and accordingly tends to draw the micrometer screw 100 downwardly. This latter force is transmitted to the upper nut 101 and through ball bearing assembly 106 to the upper surface of the cross frame member 71. The parts are accordingly maintained under a stressed condition which obviates lost motion in the threaded parts, since as wear occurs, the spring merely moves the two nuts 101 and 102 a slight distance farther apart, this being permitted by the key teeth 103 between the nuts.

Upon the nut 102, there is journalled a cylinder 116 of a diameter corresponding to that of cylinder 108, the cylinder 116 being provided with an outwardly extending key 118, which projects into a key slot 119 in the index member 30, as shown in Figure 1. Therefore, as the nut 102 is rotated, cylinder 108 is likewise rotated, but cylinder 116 is held against rotation. A collar 120 is provided for holding the cylinder 116 against axial movement on the nut 102. The cylinder 108 is provided with a micrometer scale 121, while cylinder 116 is provided with a co-operating vernier scale 122 as shown in Figure 1.

The rod 67 of frame 70 is provided with an index plate 123, which has an index edge 124 in a position so as to cooperate with scale 125 on the surface of index member 30. Accordingly, the operator can establish a reading by noting the position of the pointer 90 with reference to the scale 10, the position of edge 124 with reference to the scale 125, and the position of the scale 121 with reference to the vernier scale 122. This combination of scales provides readings which are accurate to one ten-thousandth of an inch.

The lower cross frame member 72 of the frame 70 has an outwardly extending portion 76, which is provided with a lower shoulder 77 against which the measuring pointer, generally designated 130, abuts. The measuring pointer 130 is provided with a scribing point 126 and an under shoulder 127 and with grooves 128 in its opposite faces thereof. Into the cross frame member, there is threaded a screw 129 upon which a thumb nut 131 is threaded to rotate. Between the thumb nut 131 and the cross frame member 70, there is a clamping plate 132 which has a portion 133 resting against the vertical face of the cross frame member 70 and an overhanging lip portion 134 engaging the upper surface of the cross frame member. The lower portion of the plate 132 is provided with an inwardly turned beveled edge 136.

The position of the inwardly beveled edge 136 is accordingly determined by the overhanging lip 134 and as the thumb nut 131 is turned downwardly, it draws the plate 132 towards the cross frame member 72 thereby simultaneously clamps the measuring pointer 130 against the cross frame member 70 and draws it upwardly against the shoulder portion 77. It is important that the measuring pointer 130 be drawn into engagement with the shoulder 77 inasmuch as any lack of engagement is reflected directly as an inaccuracy in the reading of the instrument.

The cross frame member 72 is likewise provided with a vertical bore 78 in which a vertical depth measuring rod, generally designated 140, is adapted to slide. The measuring rod 140 is provided with a tightly fitted adjustment screw 141 at its lower end, and with a knurled knob 142 at its upper end. Intermediate the ends of the rod are a plurality of grooves 144 spaced at intervals of one inch with reference to the lower surface 145 of the adjustment screw 141. For holding the rod 140, the lower cross frame member 72 is provided with a clamping arrangement, generally designated 150, best illustrated in Figure 7, comprising a cross bar 151 having a pivot screw 152 in one end thereof. The pivot screw 152 rests in a suitable indentation 153 in the cross frame member 72. At the opposite end of the bar 151, there is a V-headed clamp member 155, which extends into an opening 156 into engagement with the grooves 144. The cross frame member 72 is provided with a screw 157 upon which a thumb nut 158 is threaded, the thumb nut being counter-bored at 159 to receive a tension spring 160. The tension spring 160 normally bears resiliently against the bar 151 so as to apply an easy pressure upon the clamping member 155 thereby permitting restrained notching movement of rod 140 from one notch 144 to an adjacent notch. However, when the thumb nut 158 is drawn downwardly into engagement with the member 151, the clamping member 155 is drawn solidly into contact with grooves 144 of the rod 140, and the rod is solidly locked against axial movement.

Where the gauge is to be used for measurements of heights above the reference plane R, the rod 144 is moved upwardly to a position such that the lower surface 145 of the screw 141 is drawn into the vertical bore 78 thereby exposing the measuring pointer 130 as the lowermost measuring surface of the instrument.

Upon the cross-frame member 71, there is provided a further clamping arrangement comprising a screw 165 upon which a thumb nut 166 is threaded, as shown in Figures 1 and 6. The cross-frame member 71 is bored to receive a clamping collar 167 of a diameter and depth such that it intercepts and bears upon the upper nut 101 of the micrometer mechanism. Accordingly, when the thumb nut 166 is turned downwardly, the collar 167 is drawn against the micrometer nut 101 and holds the same against rotation.

In making a vertical measurement above the reference plane R, the rod 144 is retracted upwardly so as to clear the lower surface of the measuring pointer 130. The thumb nuts 62 and 58 are then loosened and the index member 30 may then be moved lengthwise of the scale 10 to any suitable position. Depending upon whether the knife edge 52 or 53 is directed toward the graduated face of the scale 10, the detent 50 will engage either the one-inch marks of the scale (using the longer knife edges 52) or all of the marks, one-eighth of an inch or longer (when utilizing the shorter knife edge 53). The position of the index member 30 is indicated by the pointer 90 adjacent the scale 10 and after appropriate selection, the thumb nut 58 is tightened thereby forcing the detent knife 50 and scale into engagement with each other so as to hold the edge 52 (or 53) of the knife in engagement with the side walls of the selected graduation lines of the scale 10. The thumb nut 62 is then tightened down and this forces collar 61 into solid contact with the edge 17 of the scale 10 thereby squaring the index member with reference to the scale.

Since the clamping member 80 maintains the bar 66 in uniform engagement with the bore 64 of the index member, the frame 70 is likewise maintained accurately parallel with respect to the scale 10. The micrometer mechanism is then rotated by means of the knurled head 105 and as the nuts 101—102 move up or down on the screw 100, they serve accordingly to move the upper cross frame member 71 upwardly or downwardly thereby moving the entire frame 70 with reference to the index member 30. In this manner, the measuring pointer 130 may be accurately moved with reference to the index member 30, the amount of movement being ascertainable from the scale 10 and pointer 90, scale 125 and edge 124, and from the scale and vernier 121—122. Since the readings of the scale 10, the scale 125 and the scale 121 are additive, accurate measurements may be made expeditiously with little chance for misreading error.

By moving the micrometer screw so as to bring the edge 124 into alignment with the zero mark on the scale 125, and the scale 121 to the zero position with reference to vernier scale 122, and by moving the index member downwardly to a predetermined position, for example, the three-inch mark on the scale 10, the lower surface of the index pointer 130 will be brought into engagement with the reference plane R. In this manner, the accuracy of the gauge may be instantly checked.

Where a measurement is to be made upon an undersurface, above the reference plane R, the pointer 130 is reversed so as to bring the surface 127 outwardly and upwardly. The surface 127 is ground so as to be an exact measurement, for example, fifty-thousandths of an inch, above the base plate when the pointer 90 is brought to, for example, the three-inch mark on the scale 10, and each of the other scales is in the zero position.

When it is desired to make a measurement below the plane R of reference, the rod 140 is notched downwardly to any selected inch mark and a reading taken as described above, the reading being subtracted from the number of inches that the surface 145 of the rod 140 is below the lower surface of the measuring pointer 130.

In this manner, accurate height measurements above and below a reference plane may accurately be made.

Many obvious variations may be apparent to those skilled in the art and are intended to be within the scope of the invention illustrated, described and claimed.

What I claim is:

1. A measuring instrument for use with a machinists' standard scale having intaglio measurement graduations and markings formed in the surface thereof, comprising a member mounted on the scale for endwise sliding movement thereon, said member including a detent for projecting into the intaglio measurement graduations whereby the member is restrained from movement on the scale, and a measurement edge projecting from the member transversely of the scale.

2. A measuring instrument for use with a machinists' standard steel scale having intaglio graduation lines etched in a surface thereof, comprising an index member having a measuring edge thereon, mountable for endwise indexing movement on the steel scale, and a detent mounted for movement toward and from the said surface of the scale, when the index member is mounted thereon, said detent being shaped to engage the intaglio graduation lines on the scale.

3. A device of the type specified in claim 2 wherein the detent is a knife edge, and means are provided for forcing the knife edge toward the scale surface having graduating lines thereon, thereby to case the knife edge to seat in the intaglio dimension lines therein.

4. A device of the type set forth in claim 2 wherein the detent has a plurality of knife edges of different lengths so as to be selectively engageable with intaglio graduation lines of different lengths on the scale.

5. A device of the type set forth in claim 2 characterized by having a spring connected to the index member for mounting the detent, said spring being sufficiently resilient that the detent may be released from engagement with any of the intaglio graduation lines by forceable movement of the index member on the scale.

6. A precision measuring instrument for use in conjunction with a standard machinists' scale of the type having as scale markings narrow intaglio transverse lines accurately spaced along a face thereof, comprising an index member having a portion for slidingly receiving the machinists' scale transversely thereof, detent means on the index member for engaging the narrow intaglio scale marking lines for holding the index member against displacement movement on the scale, a frame having a measuring surface thereon mounted for movement in a direction parallel to the scale when the index member is on the scale, and micrometric means for moving the frame with reference to the index member.

7. A device of the type set forth in claim 6 wherein the micrometric means comprises a screw mounted on the index member and a nut mounted on the frame.

8. A device of the type set forth in claim 6, including means for exerting uniform pressure between the index member and the frame so as to prevent lost motion between them.

9. A device of the type set forth in claim 6 wherein the micrometric means includes a screw mounted on the index member so as to lie parallel to the scale, and the frame includes a part through which the screw projects the micrometric means, also including two nuts keyed for rotation together on the same axes, one of said nuts being on one side of the frame part and the other on the other side of the frame part, and spring means being on one nut and on the frame so as to obviate lost motion between the screw and the frame.

10. A precision measuring instrument for use in conjunction with a standard machinists' scale made of stiff steel having accurately formed narrow intaglio scale marking lines in a face thereof, an index member having a groove thereacross for slidingly receiving the scale, means including a knife edge detent mounted on the index member for engaging the narrow intaglio scale marking lines thereby to hold the index member in fixed relation to any selected marking line, means for clamping the index member with reference to the scale to hold them against displacement, and a micrometer head having a marking edge movable therewith carried by the frame.

11. A device of the type set forth in claim 10 wherein the micrometer head having the marking edge comprises a frame having spaced rods connected together at each end and mounted for movement parallel to the scale on the index member, said slider having a micrometer screw mounted thereon and projecting through a part of the frame, an operator controlled nut on the screw bearing against one surface of said frame part, and projecting toward an opposite surface, another nut keyed for movement with the operator controlled nut adjacent the opposite surface, and spring means between the last mentioned nut and surfaces for obviating the effect of lost motion between the frame and screw.

12. A precision measuring instrument comprising two parts, one being a reference part and the other a frame part mounted for sliding movement with respect to each other, a screw mounted solidly on one of the parts and projecting through a portion of the other part, said portion having oppositely disposed surfaces, each in a plane at right angles to the screw, an operator controlled nut and a driven nut keyed together endwise and disposed so as to extend through said portion, one of said nuts having a shoulder bearing against one of the surfaces and the other having a shoulder, a spring being disposed between said shoulder and the other of said surfaces, whereby the nuts are under stress tending to force them apart, and the portion is held in abutment with the first mentioned shoulder thereby obviating the effect of lost motion between the measuring instrument parts.

13. A precision measuring instrument comprising two parts, one being a reference part, and the other a frame part, mounted for sliding movement with respect to each other, a screw mounted solidly on one of the parts and projecting through a portion of the other part, said portion having oppositely disposed surfaces each in a plane at right angles to the screw, an operator controlled nut and a driven nut keyed together endwise and disposed so as to extend through said portion, one of said nuts having a shoulder bearing against one of the surfaces, an anti-friction bearing being interposed between the shoulder and the surface, and the other of the nuts having a shoulder, a spring disposed between said last mentioned shoulder and the other of said surface, an antifriction bearing being disposed therebetween, whereby the nuts are under stress tending to force them apart and the portion is held in abutment with the first mentioned shoulder thereby obviating the effect of lost motion between the instrument parts.

14. A precision instrument of the type set forth in claim 12 further characterized by the provision of a scale on one of said parts, and an index edge cooperating with the scale and mounted for movement with the other of said parts.

15. A precision instrument of the type set forth in claim 12 further characterized by having a scale on one of said parts and a cooperating index point on the other of said parts, and by having a scale on one of said nuts together with a cooperating vernier scale movable with the other of said parts.

16. A precision instrument of the type set forth in claim 12 characterized further by the provision of a cylindrical portion having a scale thereon on one of the nuts, said nut being provided with a journal, another cylinder having a cooperating scale thereon rotatably mounted on said journal so as to move axially therewith, and key means connected to the last mentioned cylinder for holding the cylinder against rotation.

17. An instrument of the type described in claim 6 further characterized in that the measuring surface is on a rod mounted on the frame for movement parallel to the scale when the index member is thereon, said rod being provided with a plurality of index measuring stations, and catch means for holding the rod immovable with reference to the frame.

18. A device of the type described in claim 2 further characterized by having clamp means aligned with the detent for moving the detent directly towards the scale without tipping.

19. A precision measuring instrument for use with a standard machinists' steel scale of the type having narrow intaglio measurement graduation lines etched into the steel, wherein each line is a deep walled groove, a knife edge, comprising means for holding the knife edge into contact with the groove, an index member slidably mounted on the scale and connected to the knife edge so as to be restrained from sliding movement when the knife edge is held in one of the measurement graduation line grooves, a frame mounted on the index member for sliding movement parallel to the scale, said frame being provided with a measurement edge, and micrometer screw means connecting the index member and the frame for accurately moving the frame with reference to the index member.

20. A device of the type set forth in claim 2 wherein the index member includes a pointer positioned so as to cooperate with markings on the standard machinists' scale, includes a secondary index on the frame and a cooperating scale on the index member and the micrometer screw means includes a vernier scale.

21. A device of the type set forth in claim 2 wherein means are provided for exerting pressure between the index member and the scale, between the index member and the frame, and between the frame, the micrometer screw means and the index member for holding the parts in a constant condition of close mechanical contact throughout thereby obviating the effect of lost motion.

WILLIAM A. KELSEY.